United States Patent [19]

Yamamoto et al.

[11] Patent Number: 5,763,958
[45] Date of Patent: Jun. 9, 1998

[54] ANTI-THEFT SYSTEM FOR A VEHICLE ENSURING ANTI-THEFT FROM UNAUTHORIZED ACCESS TO THE SYSTEM

[75] Inventors: Keiji Yamamoto, Okazaki; Noriyasu Ohnishi, Nishikasugai-Gun; Yoshihiro Fukuta, Toyota, all of Japan

[73] Assignee: Toyota Jidosha Kabushiki Kaisha, Aichi-Ken, Japan

[21] Appl. No.: 696,435

[22] Filed: Aug. 14, 1996

[30] Foreign Application Priority Data

Aug. 23, 1995 [JP] Japan .................. 7-215009

[51] Int. Cl.⁶ .................................................. B60R 25/04
[52] U.S. Cl. ...................... 307/10.5; 180/287; 340/425.5
[58] Field of Search .............................. 307/10.1–10.6;
180/287; 340/825.3–825.32, 825.34, 825.69,
825.72, 425.5, 426; 364/423.098, 423.099,
424.034, 424.037, 424.045

[56] References Cited

U.S. PATENT DOCUMENTS

| | | | |
|---|---|---|---|
| 4,691,202 | 9/1987 | Denne et al. | 340/825.34 |
| 4,835,514 | 5/1989 | Masegi et al. | 307/10.2 |
| 5,561,332 | 10/1996 | Udo et al. | 307/10.5 |
| 5,561,420 | 10/1996 | Kleefeldt et al. | 340/825.31 |
| 5,610,574 | 3/1997 | Mutoh et al. | 340/426 |

FOREIGN PATENT DOCUMENTS

| | | |
|---|---|---|
| WO8803884 | 6/1988 | European Pat. Off. . |
| 275789 | 7/1988 | European Pat. Off. . |
| 354102 | 2/1990 | European Pat. Off. . |
| 9004587 | 3/1991 | European Pat. Off. . |
| 4317114 | 11/1994 | Germany . |
| 4317118 | 11/1994 | Germany . |
| 61-9361 | 1/1986 | Japan . |
| 3-125653 | 12/1991 | Japan . |
| 5-106375 | 4/1993 | Japan . |

*Primary Examiner*—Richard T. Elms
*Attorney, Agent, or Firm*—Kenyon & Kenyon

[57] ABSTRACT

An anti-theft system for a vehicle which monitors a state of a memory storing a check code so as to maintain a prohibition of operation of the vehicle when an abnormal state is detected in the memory. A control unit, provided in the vehicle, has a memory in which a first check code is recorded. A transmitting unit transmits a second check code to the control unit. The transmitting unit is separate from the control unit. Prohibition of operation of the vehicle is withdrawn when the first check code matches the second check code. The withdrawal of prohibition is prohibited when it is determined that the memory is not connected to the control unit. The withdrawal of prohibition may be prohibited when a first ID code stored in the memory does not match a second ID code stored in a second memory provided in the control unit.

13 Claims, 7 Drawing Sheets

ANTI-THEFT SYSTEM FOR A VEHICLE ENSURING ANTI-THEFT FROM UNAUTHORIZED ACCESS TO THE SYSTEM

BACKGROUND OF THE INVENTION

1. Field of the Invention

The present invention relates to an anti-theft system for a vehicle and, more particularly, to an anti-theft system using a check code to determine the correspondence between a key and a vehicle.

2. Description of the Related Art

Conventionally, an anti-theft system for a vehicle is known such as a system disclosed in Japanese Laid-Open Utility Model Application No.3-125653. In this system, a check code is provided to both a vehicle and an ignition key for starting operation of the engine of the vehicle. The prohibition of operation of the engine of the vehicle is canceled only when it is determined that the check code provided to the ignition key matches the check code provided to the vehicle. Accordingly, the engine cannot be started without the ignition key is provided with a correct check code. This provides an anti-theft function for a vehicle.

However, if the anti-theft system is not operating in a normal condition due to damage or destruction, operation of the vehicle is possible when the correct ignition key is not used. Accordingly, it is suggested to maintain the vehicle in a non-operable state when an abnormal condition is detected in the anti-theft system so as to ensure reliability of the anti-theft function.

In this point of view, the above-mentioned conventional anti-theft system has a function to periodically check the state of the electric circuit provided therein. That is, if an abnormal condition is detected, the non-operable state is maintained even when the check code assigned to the ignition key is determined to match the check code assigned to the vehicle. When such a control is performed in the anti-theft system, the vehicle cannot be started by destroying or damaging the anti-theft system. Thus, reliability of the anti-theft function is increased.

The above-mentioned anti-theft system comprises a memory storing a check code. When the check code is transmitted from the ignition key to the anti-theft system, the check code stored in the memory is read out so as to determine if there is a match between the read out check code and the check code transmitted from the ignition key.

In the above-mentioned conventional anti-theft system, there is no monitoring system to monitor the condition of the memory. Accordingly, if the memory should be removed from the anti-theft system, the abnormality that the memory is not present cannot be detected. If the memory is removed from the system, the anti-theft system may consider that a check code (hereinafter referred to as a 0-code) each bit of which is set to zero or a check code (hereinafter referred to as a 1-code) each bit of which is set to one is assigned to the vehicle.

Accordingly, when the memory is removed from the anti-theft system and an ignition key having the 0-code or the 1-code is used, it may be possible to start and operate the vehicle. Additionally, if the memory is replaced by another memory storing a known check code and an ignition key having a check code matching the known check code is used, the vehicle could possibly be placed in an operable state.

As mentioned above, the conventional anti-theft system has a problem in that a possible operation of a vehicle cannot be prohibited when the memory storing the check code is removed or replaced since the state of the memory is not monitored.

SUMMARY OF THE INVENTION

It is a general object of the present invention to provide an improved and useful anti-theft system for a vehicle in which the above-mentioned problem is eliminated.

A more specific object of the present invention is to provide an anti-theft system for a vehicle which monitors a state of a memory storing a check code so as to maintain a prohibition against operation of the vehicle when an abnormal state is detected in the memory.

In order to achieve the above-mentioned object, there is provided according to one aspect of the present invention an anti-theft system for a vehicle, comprising:

a control unit, provided in the vehicle, having a memory in which a first check code is recorded;

a transmitting unit transmitting a second check code to the control unit, the transmitting unit being separate from the control unit;

prohibition withdrawing means for withdrawing prohibition of operation of the vehicle when the first check code matches the second check code;

connection determining means for determining whether the memory is connected to the control unit; and withdrawal prohibiting means for prohibiting withdrawal of prohibition of operation of the vehicle when it is determined that the memory is not connected to the control unit.

In the above-discussed invention, the second check code is compared with the first check code assigned to the vehicle. If it is determined that the second code matches the first check code, it can be determined that an operation of the vehicle is attempted in a justified manner. In this case, the prohibition of operation of the vehicle is withdrawn. However, when the memory storing the first check code is removed, the withdrawal of prohibition of the operation of the vehicle is prohibited so that the vehicle is maintained in a non-operable state. Thus, an attempt to operate the vehicle through an unjustified act, such as removing the memory storing the first check code, can be positively prevented.

The control unit may include communication means for receiving the second check code transmitted by the transmission unit, operation of the communication means being permitted only when it is determined that the memory is connected to the control unit.

Accordingly, if the memory is not connected to the control unit, the communication means cannot be operated. Thus, the prohibition of operation of the vehicle is not withdrawn. That is, the vehicle is maintained in a non-operable state when the memory is not connected to the control unit.

In one embodiment according to the present invention, the transmitting unit may comprise a transponder responsive to a magnetic field generated by the communication means.

The transmitting unit may be incorporated into a key, and the communication means may include a key cylinder having an antenna coil to provide the magnetic field to the transponder when the key is inserted into the key cylinder.

In the anti-theft system according to the present invention, the control unit may be connected to means for controlling the engine of the vehicle, and the operation prohibiting means may prohibit operation of the engine when the control unit does not receive the second check code.

Additionally, the operation prohibiting means may continue to prohibit operation of the engine when it is determined that the memory is disconnected from the control unit.

3

In one embodiment, the memory comprises an electrically erasable programmable read only memory.

Additionally, there is provided according to another aspect of the present invention an anti-theft system for a vehicle, comprising:

- a control unit, provided in the vehicle, having a first memory in which a first check code and a first ID code are recorded, the control unit further having a second memory in which a second ID code is recorded;
- a transmitting unit transmitting a second check code to the control unit, the transmitting unit being separate from the control unit;
- prohibition withdrawing means for withdrawing prohibition of operation of the vehicle when the first check code matches the second check code and when the first ID code matches the second ID code; and
- withdrawal prohibiting means for prohibiting withdrawal of prohibition of operation of the vehicle when it is determined that the first ID code does not match the second ID code.

According to this invention, the withdrawal of the prohibition of operation of the vehicle is made only when the first ID code matches the second ID codes. Thus, if the first memory storing the first check code is removed or replaced with a forged memory, the vehicle is maintained in a non-operable state because the first ID code does not match the second ID code in such a case.

The anti-theft system may further comprise deleting means for deleting the first check code and the first ID code in the first memory when it is determined that the first ID code does not match the second ID code.

Additionally, the anti-theft system may further comprise alarming means for generating an alarm when it is determined that the first ID code does not match the second ID code.

The anti-theft system may further comprise changing means for changing the first ID code and the second ID code to a new ID code at a predetermined time period after it is determined that the first code matches the second ID code. According this feature, the first ID code and the second ID code are changed every time the vehicle is operated. Thus, it is difficult to know the first ID code currently stored in the first memory. Thus, forgery of the first memory is positively prevented.

In one embodiment, the first memory may comprise an electrically erasable programmable read only memory. The second memory may comprise a random access memory.

Other objects, features and advantages of the present invention will become more apparent from the following detailed description when read in conjunction with the accompanying drawings.

4

Figure 7:
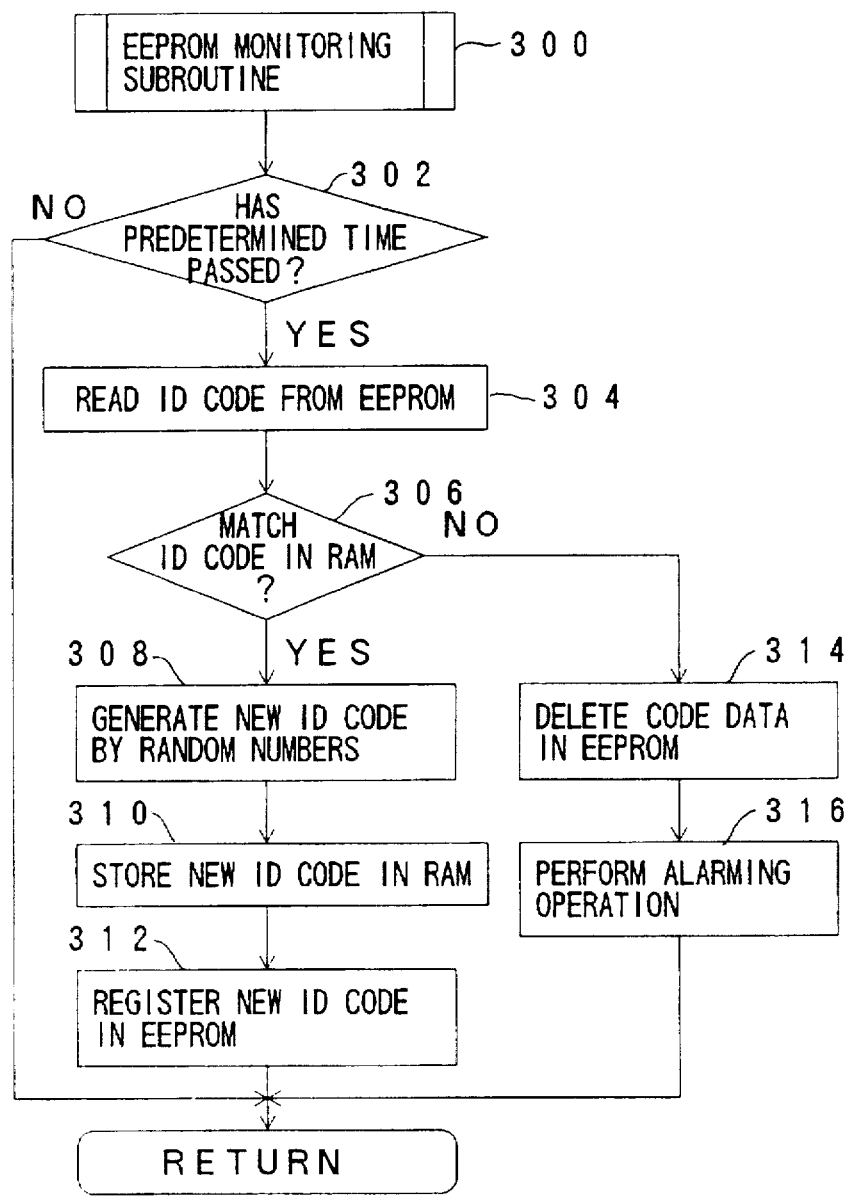

FIG.7 is a flowchart of an EEPROM monitoring subroutine.

DETAILED DESCRIPTION OF THE PREFERRED EMBODIMENTS

Figure 1:
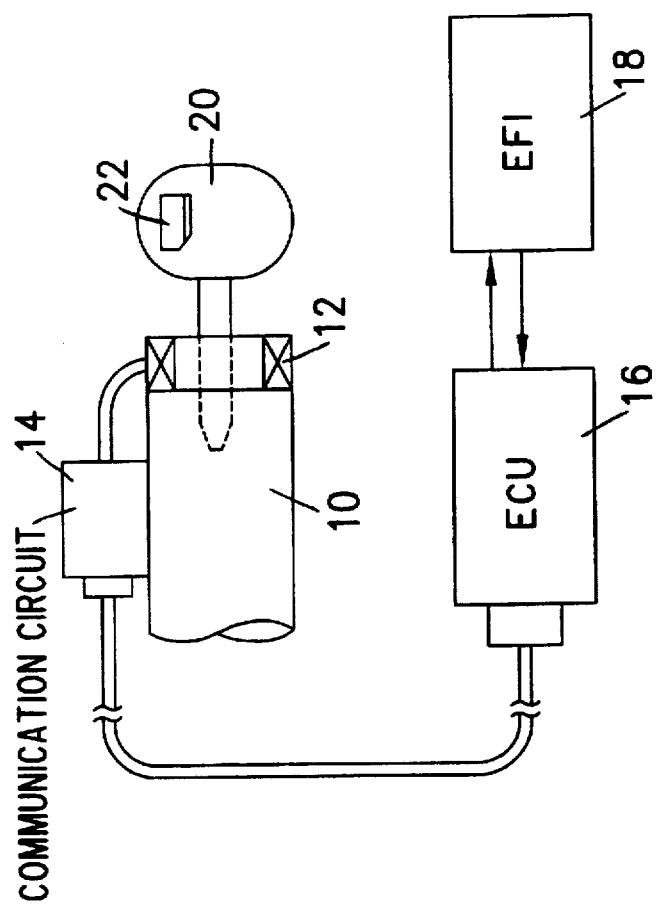
FIG.1 is a structural diagram of an anti-theft system for a vehicle according to a first embodiment of the present invention.

A description will now be given of a first embodiment of the present invention. FIG.1 is a structural diagram of an anti-theft system for a vehicle according to the first embodiment of the present invention.

The anti-theft system according to the first embodiment of the present invention comprises a cylinder key 10, an antenna coil 12 provided at an end of the cylinder key 10, a communication circuit 14 connected to the antenna coil 12, an electronic control unit (ECU) 16 connected to the communication circuit 14, an engine controlling computer (EFI computer) 18 connected to the ECU 16 and a transponder 22 incorporated in a key 20.

Figure 2:
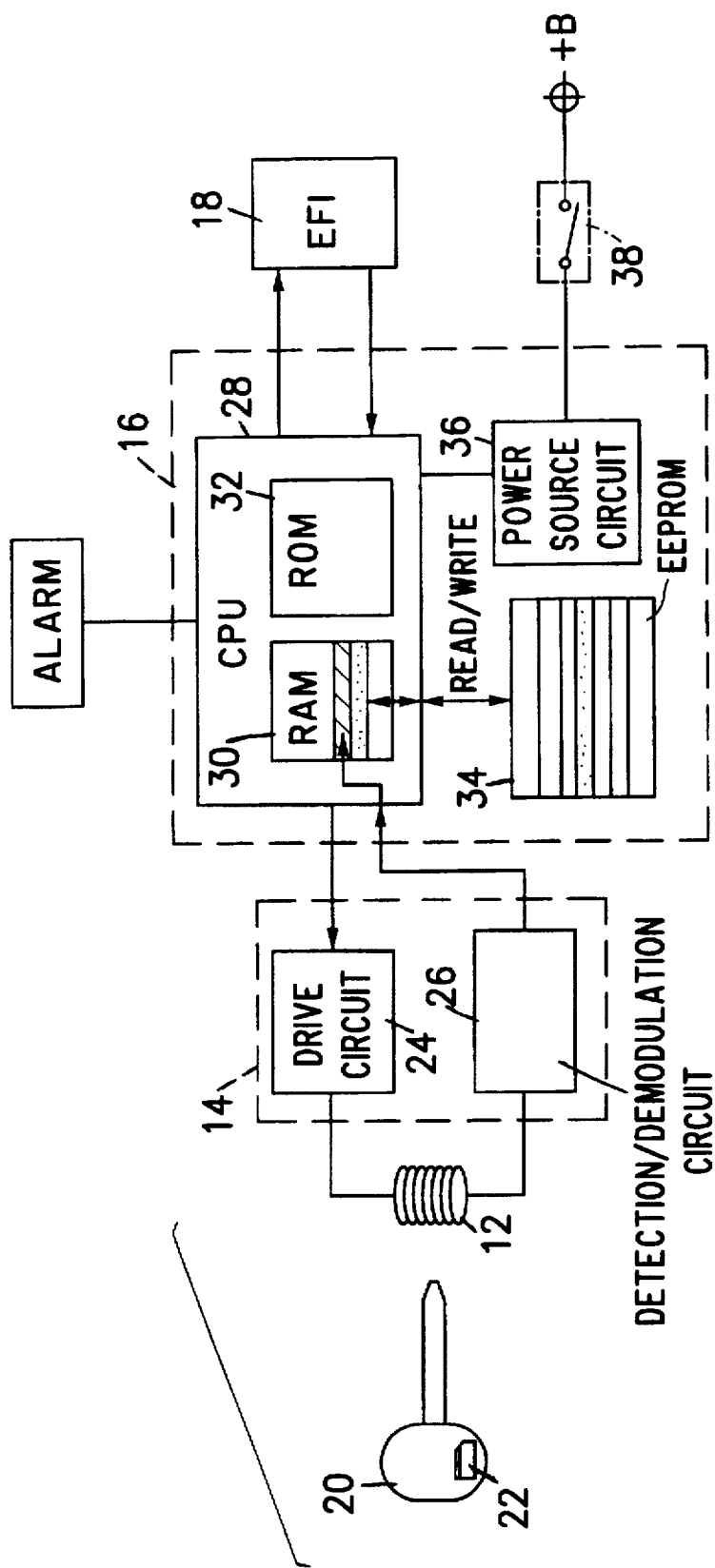
FIG.2 is a block diagram of the anti-theft system shown in FIG.1.

FIG.2 is a block diagram of the anti-theft system shown in FIG. 1. In FIG. 2, the communication circuit 14 and the ECU 16 are described in detail. As shown in FIG.2, an end of the antenna coil 12 is connected to a drive circuit 24 provided in the communication circuit 14, and the other end of the antenna coil 12 is connected to a detection/demodulation circuit 26 also provided in the communication circuit 14. The drive circuit 24 outputs a voltage signal having a predetermined amplitude. When the voltage signal is output from the drive circuit 24, a voltage across the antenna coil 12 oscillates at a predetermined frequency with a predetermined amplitude.

The detection/demodulation circuit 26 detects an amplitude of the voltage fluctuation at an end of the antenna coil 26, and outputs a signal in response to the detected amplitude. The transponder 22 incorporated in the key 22 transmits a check code to the antenna coil 12 by a serial transmission. When the signal is transmitted from the transponder 22, the amplitude of the voltage fluctuation at the end of the antenna coil 12 is modulated. The detection/demodulation circuit 26 demodulates the change in the amplitude of the voltage fluctuation, and generates a high or low output signal in response to each bit included in the check code transmitted from the transponder 22.

The voltage signal output from the detection/demodulation circuit 26 is supplied to a micro computer 28 provided in the ECU 16. The microcomputer 28 includes a random access memory (RAM) 30 which is a non-volatile memory, and a read only memory (ROM) 32. The microcomputer 28 recognizes a portion of the signal output from the detection/demodulation circuit 26 as the check code transmitted by the transponder 22, and records the check code in the RAM 30.

The microcomputer 28 is connected to an electrically erasable programmable ROM (EEPROM) 34, a power source circuit 36 and the EFI computer 18. A predetermined check code assigned to the vehicle is recorded in the EEPROM 34 which is a non-volatile memory. The microcomputer 28 determines whether or not the check code recorded in the RAM 30 matches the check code recorded in the EEPROM 34. When the check codes match, an instruction is issued from the microcomputer 28 to the EFI computer 18 to render the vehicle in an operable state. More specifically, the instruction includes information for turning on an ignition system and information for allowing a fuel injection operation. On the contrary, when the check codes do not match, the instruction is not issued from the microcomputer 28 to the EFI computer 18. In this case, the ignition system is turned on, and fuel injection is not performed. Thus, the operation of the vehicle cannot be started.

The power source circuit 36 supplies a driving power to the microcomputer 28. The power source circuit 36 is connected to a power source via a key switch 38. The power source circuit 36 generates a voltage of 5V when a source voltage (+B) is supplied thereto. The key switch 38 is turned on when the key 20 is inserted into the key cylinder 10. Thus, when the key 20 is not inserted into the key cylinder 10, the power source circuit 36 does not generate the voltage of 5V. Thus, the microcomputer 28 does not operate. In this case, the communication circuit 14 is also maintained in a non-operable state. When the key 20 is inserted into the key cylinder 10, the source voltage is supplied to the microcomputer 28 via the power source circuit 36. Thus, the microcomputer 28 and the communication circuit 14 are turned to an operable state.

Figure 3:
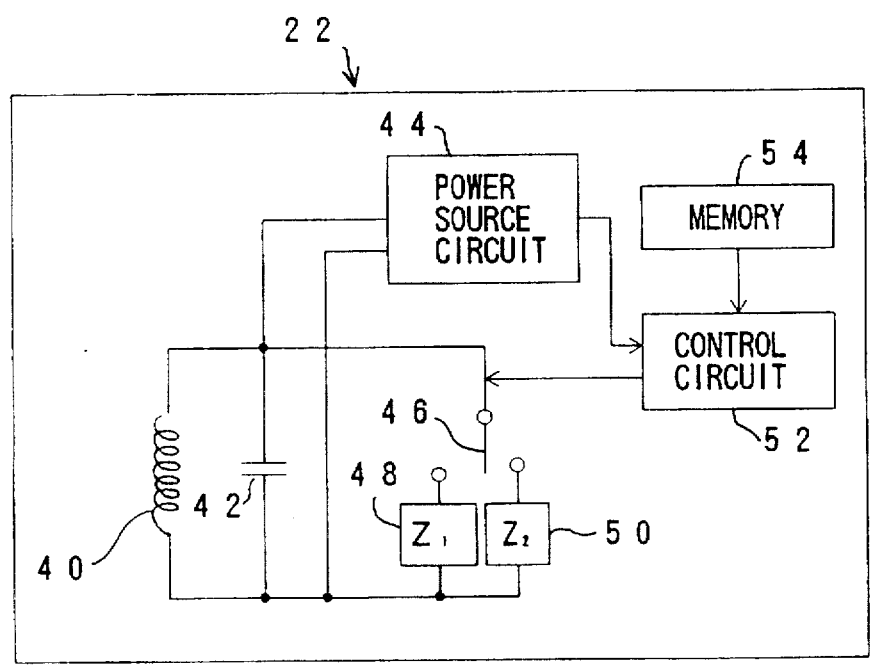
FIG.3 is a block diagram of circuitry of a transponder shown in FIG.1.

A description will now be given, with reference to FIG.3, of a structure of the transponder 22. FIG.3 is a block diagram of the circuitry of the transponder 22. The transponder includes a coil 40. When the voltage across the antenna coil 12 fluctuates at a predetermined period, an alternate magnetic field is generated around the antenna coil 12. The coil 40 is provided in the transponder 22 to detect the alternate magnetic field when the key 20 is inserted into the key cylinder 10.

An end of the coil 40 is connected to a terminal of a capacitor 42, a terminal of a power source circuit 44 and a switch circuit 46. An opposite end of the coil 40 is connected to an opposite terminal of the capacitor 42, an opposite terminal of the power source circuit 44 and load circuits 48 and 50. The coil 40 and the capacitor 42 together constitute an LC oscillation circuit. The specifications of the coil 40 and the capacitor 42 are determined to generate a resonance in the LC oscillation circuit when the alternate magnetic field is generated by the antenna coil 12. Additionally, a rectifying circuit is provided in the power source circuit 44 to rectify a resonance signal to generate a predetermined DC voltage when the resonance is generated in the LC oscillation circuit.

The DC voltage generated in the power source circuit 44 is supplied to a control circuit 52. The control circuit 52 is connected to a memory 54. A check code the same as that recorded in the EEPROM 34 is recorded in the memory 54. The control circuit 52 supplies a drive signal to the switch circuit in accordance with the check code recorded in the memory 54 when power is supplied by the power source circuit 44.

Load circuits 48 and 50 are provided with different loads Z1 and Z2, respectively. When a drive signal is supplied from the control circuit 52 to the switch circuit 46 to connect the load circuit 48, the load Z1 is connected to the LC oscillation circuit comprised of the coil 40 and the capacitor 42. This state is hereinafter referred to as a first state. On the other hand, when a drive signal is supplied from the control circuit 52 to the switch circuit 46 to connect the load circuit 50, the load Z2 is connected to the LC oscillation circuit comprised of the coil 40 and the capacitor 42. This state is hereinafter referred to as a second state.

A resonance condition of the LC oscillation circuit differs from the first state in which the load Z1 is connected to the LC oscillation circuit to the second state in which the load Z2 is connected to the LC oscillation circuit. In this embodiment, a value of the load Z1 is determined so that the resonance frequency of the LC oscillation circuit matches the frequency of the alternate magnetic field generated by the antenna coil 12 when the first state is achieved. Additionally, a value of the load Z2 is determined so that the resonance frequency of the LC oscillation circuit is shifted from the frequency of the alternate magnetic field generated by the antenna coil 12 when the second state is achieved. Accordingly, voltage signals having different amplitudes are generated across the coil 40 in response to the connection of the switch circuit 46.

As mentioned above, according to the present embodiment having the transponder 22, the amplitude of the voltage generated across the coil 40 can be changed in accordance with the connection of the switch circuit 46 as to which load circuit 48 or 50 is connected via the switch circuit 46. The control circuit 52 controls the connection of the switch circuit 46 to either one of the load circuits 48 and 50 in accordance with a value of each bit of a signal to be transmitted being "1" or "0". When the control circuit 52 operates the switch circuit 46, a voltage having an amplitude corresponding to a value of a bit of the signal to be transmitted is generated across the coil 40.

The control circuit 52 sequentially supplies a series of drive signals, which correspond to a start signal, to the switch circuit 46 after a supply of the power from the power source circuit 44 is started. Then, the control circuit 52 sequentially supplies to the switch circuit 46 a series of drive signals which correspond to the check code recorded in the memory 54 and a series of drive signals which correspond to a stop signal. Thus, after the transponder 22 is activated, a) the variation in the amplitude of the voltage corresponding to the start signal, b) the variation in the amplitude of the voltage corresponding to the check code and c) the variation in the amplitude of the voltage corresponding to the stop signal appear across the coil 40 of the transponder 22 with respect to passage of time.

During the process of inserting the key 20 into the cylinder key 12, when the transponder 22 moves close to the antenna coil 12, a mutual inductance M between the antenna coil 12 and the coil 40 of the transponder 22 is increased. Thus, the inductance of the antenna coil 12 is influenced by a state of the coil 40. In such a condition, the amplitude of the voltage across the antenna coil 12 is influenced by the amplitude of the voltage across the coil 40. That is, a voltage having an amplitude corresponding to the amplitude of the voltage across the coil 40 is generated across the antenna coil 12. The amplitude of the voltage generated across the antenna coil 12 corresponds to the value of each bit of the signal to be transmitted.

Accordingly, when the voltages having the amplitudes corresponding to the start signal, the check code and the stop signal are generated sequentially across the coil 40 with respect to passage of time, the voltages having amplitudes corresponding to values of bits of the start signal, check signal and the stop signal are generated across the antenna coil 12. The detection/demodulation circuit 26 demodulates the variation in the amplitude of the voltages across the antenna 12 to a binary signal, and supplies the binary signal to the microcomputer 28.

The microcomputer 28 recognizes the part of the binary signal between the start signal and the stop signal as a signal corresponding to the check code transmitted from the transponder 22. The part of the binary signal corresponding to the check code comprises a predetermined number of bits. Thereafter, the check code is recorded in the RAM 30, and a process is performed for maintaining or withdrawing the prohibition of operation of the vehicle.

When the EEPROM 34 is removed from the anti-theft system, the microcomputer considers that a check code, all bits of which are set to zero, is received. In this state, an unjustified or unauthorized matching of the check codes can be easily achieved by using a transponder which transmits a check code whose bits are all set to zero.

The present embodiment is provided to maintain the prohibition of operation of the vehicle even when such an unauthorized withdraw of the prohibition of operation of the vehicle is attempted.

A description will now be given, with reference to FIG.4, as to how to prevent such an unauthorized act.

Figure 4:
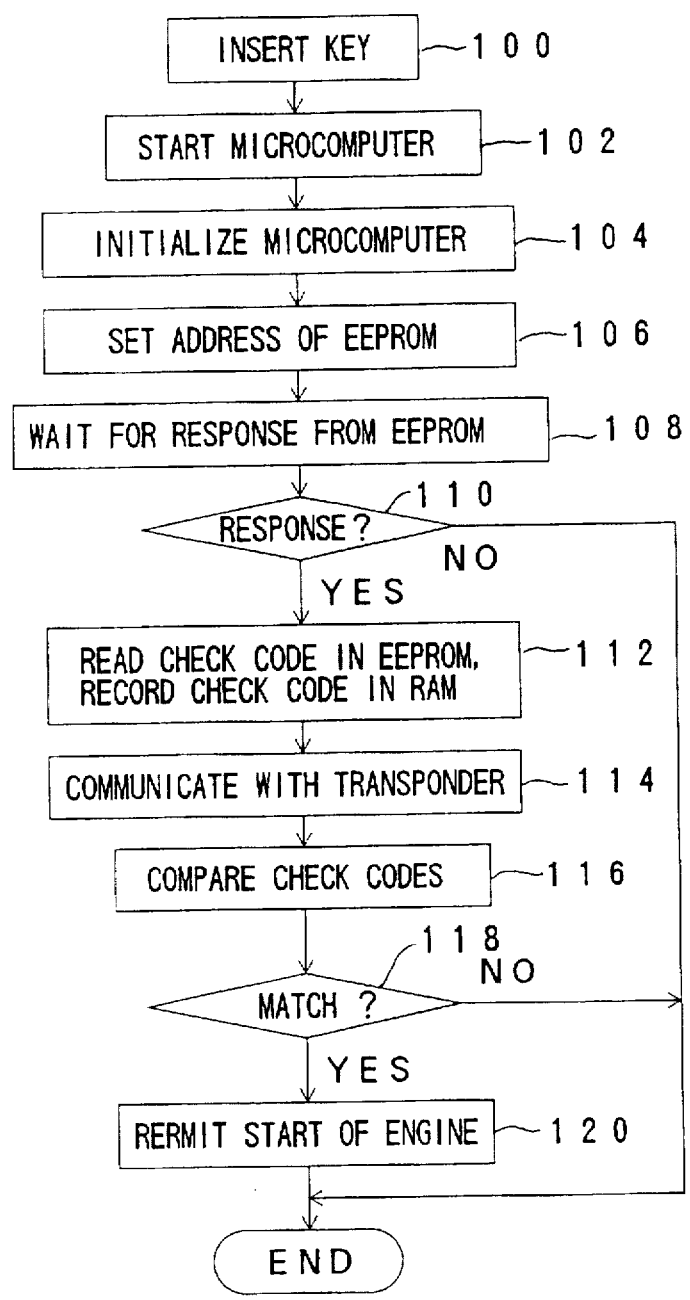
FIG.4 is a flowchart of a routine performed in the first embodiment to prevent an unjustified act.

FIG.4 is a flowchart of a routine performed by the ECU 16 so as to prevent the unauthorized act.

The operation shown in FIG.4 is started by inserting the key 20 into the key cylinder 10 as shown in step 100. In step 102, an operation of the microcomputer is started. Then, in step 104, the microcomputer 28 is initialized.

In step 106, an address setting is performed for the EEPROM 34 so that a reading of the check code recorded in the EEPROM 34 is enabled. The address setting is achieved by sending an address signal corresponding to the address at which the check code is recorded.

When the address signal is supplied to the EEPROM 34, the EEPROM 34 sends back a predetermined response signal to the microcomputer 28 so as to indicate the reception of the address signal. Thus, in step 108, the microcomputer is set in a waiting state where the response signal is to be received.

After a predetermined time period has elapsed, it is determined, in step 110, whether or not the response signal was received from the EEPROM 34. If it is determined that the response signal was not received, it is determined that the EEPROM 34 has been removed from the ECU 16. Thus, the operation for withdrawing the prohibition of an operation of the vehicle is not resumed, and the routine is ended. In this case, The EFI computer is maintained to be in a mode in which starting of the engine is prohibited. Thus, the vehicle is positively maintained in a state where the operation is prohibited.

On the other hand, if it is determined, in step 110, that the response signal was received from the EEPROM 34 within the predetermined time period, the routine proceeds to step 112. In step 112, the check code recorded in the EEPROM is read, and the read check code is recorded in the RAM 30.

Thereafter, in step 114, a communication is performed with the transponder. Then, in step 116, a signal obtained by the communication is encoded. It is then determined, in step 118, whether the check code read from the EEPROM 34 matches the check code transmitted from the transponder 22.

If it is determined that the check codes match, the routine proceeds to step 120. In step 120, an operation for permitting starting of the engine is performed, and the routine is ended. More specifically, in step 120, an instruction is issued to the EFI computer to turn on the ignition system and to permit a fuel injecting operation. Thus, the engine is set in an operable state, resulting in the withdrawal of the prohibition of operation of the vehicle.

On the other hand, if it is determined, in step 118, that the check codes does not match, the routine is ended without proceeding to step 120 so that the vehicle is maintained in the operation prohibited state.

As mentioned above, in the anti-theft system according to the present embodiment, the vehicle can be maintained in the operation prohibited state when the check code recorded in the EEPROM 34 does not match the check code recorded in the transponder 22. Additionally, the operation prohibited state is also maintained when the EEPROM 34 is removed from the ECU 16. Thus, according to the anti-theft system according to the present embodiment, an unauthorized withdrawal of the prohibition of operation of the vehicle, which is achieved by removing the EEPROM 34, can be prevented. Thus, high reliability with respect to anti-theft is obtained.

Figure 5:
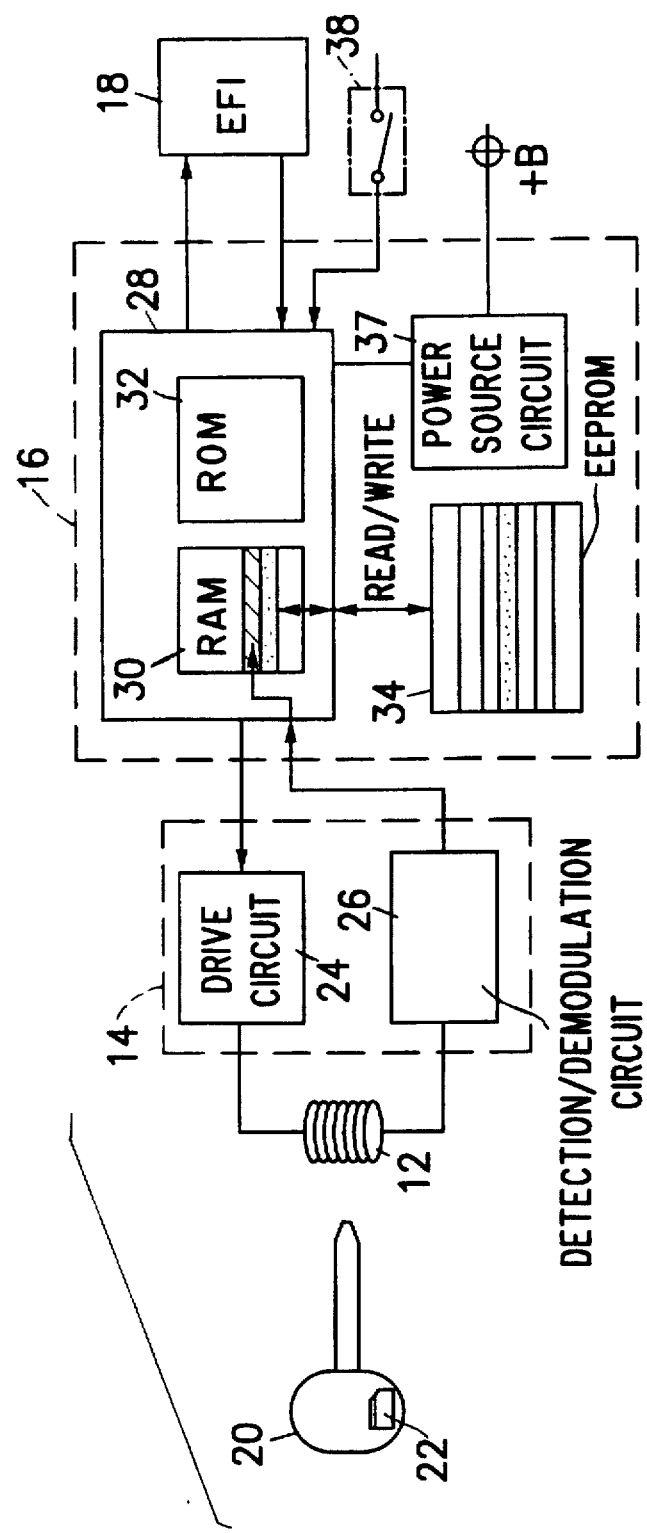
FIG.5 is a block diagram of an anti-theft system according to a second embodiment of the present invention.

A description will now be given of a second embodiment of the present invention. FIG.5 is a block diagram of an anti-theft system according to the second embodiment of the present invention. In FIG.5, parts that are the same as the parts shown in FIG.2 are given the same reference numerals, and descriptions thereof will be omitted.

In the anti-theft system shown in FIG.5, the key switch 38 is directly connected to the microcomputer 28. Additionally, the power source voltage (+B) is directly provided to the power source circuit 37. The power source circuit 37 has a secondary battery therein so that an ID code recorded in the RAM 30 is maintained when the power source voltage (+B) is interrupted. Accordingly, the microcomputer 28 is maintained in an operable state irrespective of condition of the key switch 38. Additionally, the contents of the RAM 30 are also maintained irrespective of the condition of the key switch 38.

An ID code assigned to the ROM 32 is recorded in the EEPROM 34 together with the check code assigned to the vehicle. The ID code recorded in the EEPROM 34 is also recorded in the RAM 30. Accordingly, it can be determined whether or not the ID code recorded in the EEPROM 34 matches the ID code recorded in the RAM 30. This means that it can be determined whether or not the correct EEPROM 34 is provided in the ECU 16.

In the above-discussed first embodiment, if the EEPROM 34 is removed, the withdrawal of the prohibition of an operation of the vehicle is prevented. However, the first embodiment has nothing to do with a case in which the EEPROM 34 is replaced by a forged EEPROM. That is, in the first embodiment, if the EEPROM is replaced by a forged EEPROM in which a known check code is recorded, the prohibition of operation of the vehicle may be withdrawn by using a transponder having a check code which matches the known check code.

The second embodiment has a feature in which the prohibition of operation of the vehicle can still be maintained even when the above-mentioned case occurs. A description will now be given of an operation performed by the microcomputer 28 so as to achieve this feature of the second embodiment.

Figure 6:
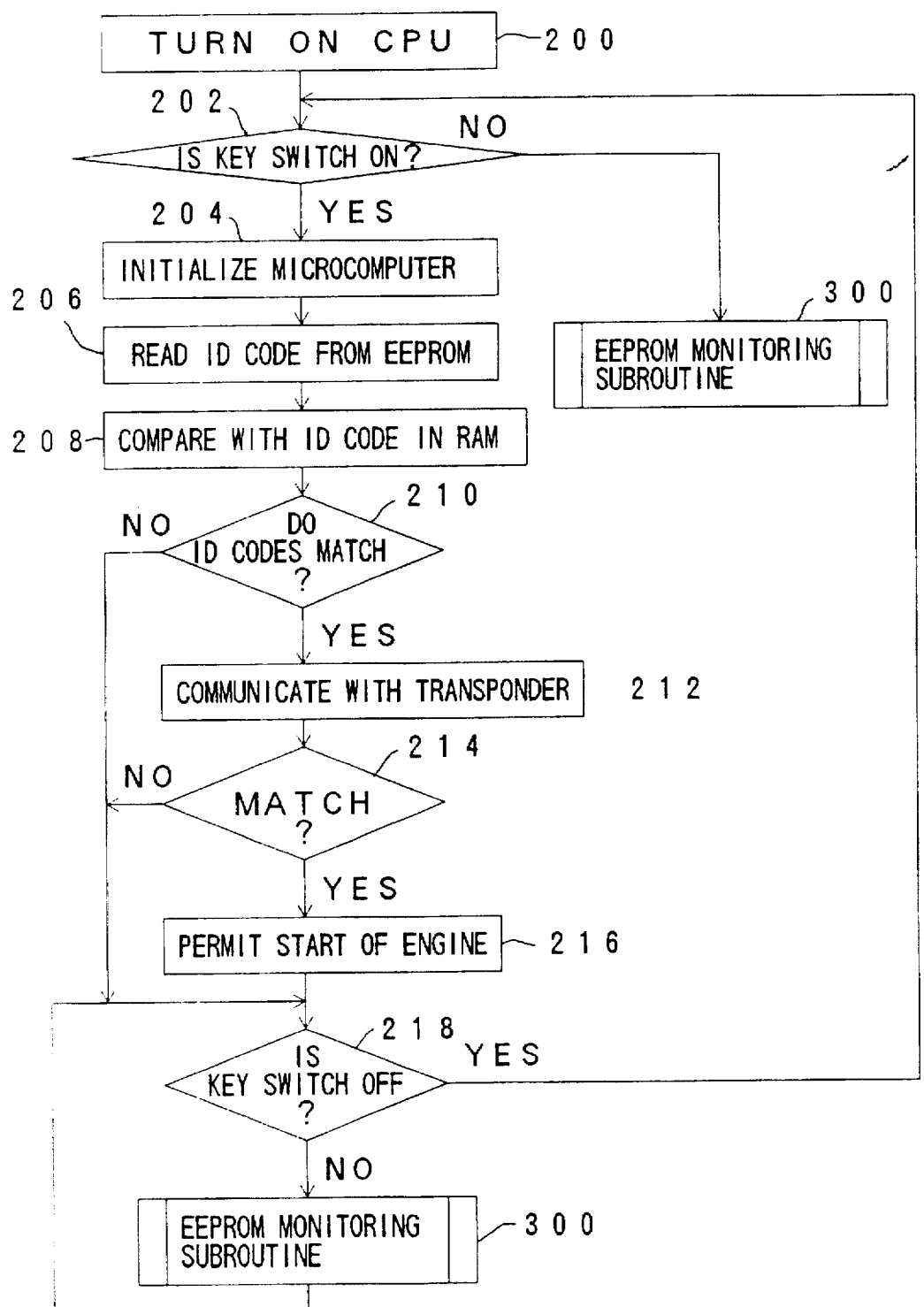
FIG.6 is a flowchart of a routine performed by a microcomputer shown in FIG.5.

FIG.6 is a flowchart of a routine performed by the microcomputer 28. This routine is started when the source voltage is supplied to the ECU 16 and the power of the microcomputer 28 is turned on in step 200. After the routine is started, it is determined, in step 202, whether or not the key switch 38 is turned on.

If it determined that the key switch 38 is not turned on, it is determined that the key 20 is not inserted into the key cylinder 10. That is, it is determined that a start operation of the vehicle is not required, and then the routine proceeds to step 300. In step 300, a subroutine for monitoring the EEPROM is executed. The subroutine for monitoring the EEPROM will be described later with reference to FIG.7. On the other hand, if it is determined, in step 202, that the key switch 38 is turned on, the routine proceeds to step 204. In step 204, the microcomputer 28 is initialized.

After the initialization of the microcomputer 28 is completed, the ID code recorded in the EEPROM 34 is read in step 206. Then, in step 208, the read ID code is compared with the ID code recorded in the RAM 30.

In step 210, it is determined whether or not the two ID codes match. If it is determined that the two ID codes match, the routine proceeds to step 212. In step 212, communication is performed with the transponder 22. Then, it is determined, in step 214, whether or not the check code transmitted from the transponder 22 matches the check code recorded in the EEPROM 34. If it is determined that the two check codes match, the routine proceeds to step 216. In step 216, a process for permitting starting of the engine is performed.

On the other hand, if it is determined, in step 210, that the Id code recorded in the EEPROM 34 does not match the ID code recorded in the RAM 30, or if it is determined, in step 214, that the check code recorded in the EEPROM 34 does not match the check code transmitted from the transponder 22, the routine proceeds to step 218. In these cases, since the EFI computer 28 is maintained in the mode to prohibit starting of the engine, the vehicle is positively maintained in the operation prohibited state.

As mentioned above, according to the present embodiment, the prohibition on starting of the vehicle cannot be withdrawn unless the check code recorded in the EEPROM 34 matches the check code recorded in the transponder 22 and the ID code recorded in the EEPROM 34 matches the ID code recorded in the RAM 30. Thus, according to the present invention, the vehicle can be positively maintained in the operation prohibition state even if an unauthorized start of the engine is attempted by using a forged transponder.

In step 218, it is determined whether or not the key switch 38 is turned off. That is, it is determined whether or not the key 20 is removed from the key cylinder 10. If it is determined that the key switch 38 is turned off, the routine returns to step 202. In this case, since it is determined in step 202 that the key switch 38 is not turned on, the routine proceeds to step 300 in which an EEPROM monitoring subroutine is started. Thereafter, the step 202 and the EEPROM monitoring subroutine are repeated until the key switch 38 is turned on.

On the other hand, if it is determined, in step 218, that the key switch 38 is not turned off, the routine directly proceeds to step 300 to start the EEPROM monitoring subroutine. Thereafter, the step 218 and the EEPROM monitoring subroutine are repeated until the key switch 38 is turned off.

A description will now be given of the EEPROM monitoring subroutine. FIG.7 is a flowchart of the EEPROM monitoring subroutine.

When the EEPROM monitoring subroutine is started, it is determined, in step 302, whether or not a predetermined period of time has passed. If it is determined that the predetermined period of time has not passed, the routine is ended without performing any process. On the other hand, if it is determined that the predetermined period of time has already passed, the routine proceeds to step 304.

In step 304, the ID code recorded in the EEPROM 34 is read by the microcomputer 28. The microcomputer 28 determines, in step 306, whether or not the ID code read from the EEPROM 34 matches the ID code recorded in the RAM 30.

If it is determined that the two ID codes match, it is determined that the correct EEPROM 34 is provided in the ECU 16. In this case, a new ID code is generated, in step 308, by using random numbers. Then, the new ID code is stored in the RAM 30 in step 310. In step 312, the new ID code is registered in the EEPROM 34, and the EEPROM monitoring subroutine is ended.

On the other hand, if it is determined, in step 306, that the ID code read from the EEPROM 306 does not match the ID code recorded in the RAM 30, it is determined that the EEPROM 34 provided in the ECU 16 is not a correct EEPROM. In this case, the routine proceeds to step 314 to delete the code data recorded in the EEPROM 34. Then, in step 316, an alarm operation is performed, and the EEPROM monitoring subroutine is ended. As is known in the art, the alarm may consist of flashing lights, horns, buzzers and the like.

As mentioned above, the microcomputer 28 repeats the EEPROM monitoring subroutine when the key switch 38 is maintained in the on state or the off state. When the EEPROM monitoring subroutine is repeated, it is determined for each predetermined period of time whether or not the EEPROM 34 provided in the ECU 16 is the correct EEPROM. If it is determined that the correct EEPROM is provided in the ECU 16, the ID code is changed to a new ID code. Thus, it is extremely difficult to know the ID code recorded in the EEPROM 34. Additionally, if it is determined that an EEPROM having a different ID code is provided, an alarm operation is performed. Accordingly, it is extremely difficult to replace the correct EEPROM 34 with a forged EEPROM.

As mentioned above, according to the present embodiment, an unauthorized act to withdraw the operation prohibition state of the vehicle by replacing the EEPROM can be positively prevented. Thus, the system according to the present invention has a high reliability as compared to the conventional system in which the operation prohibition state is maintained or withdrawn based on only a matching of check codes.

The present invention is not limited to the specifically disclosed embodiments, and variations and modifications may be made without departing the scope of the present invention.

What is claimed is:

1. An anti-theft system for a vehicle comprising:
   a control unit, provided in said vehicle for controlling operation of the vehicle;
   a memory directly connected to the control unit, the memory unit storing a first check code;
   a transmitting unit transmitting a second check code to said control unit, said transmitting unit being separate from said control unit;
   prohibition withdrawing means for withdrawing prohibition of operation of said vehicle when said first check code matches said second check code;
   connection determining means for determining whether said memory is connected to said control unit, wherein a determination of the connection determining means is performed by reading the first check code stored in a predetermined address of the memory and wherein the predetermined address is designated by the control unit when the determination is performed; and
   withdrawal prohibiting means for prohibiting withdrawal of prohibition of operation of said vehicle when it is determined that said memory is not connected to said control unit.

2. The anti-theft system as claimed in claim 1, wherein said control unit includes communication means for receiving said second check code transmitted by said transmission unit, an operation of said communication means being permitted only when it is determined that said memory is connected to said control unit.

3. The anti-theft system as claimed in claim 2, wherein said transmitting unit comprises a transponder responsive to a magnetic field generated by said communication means.

4. The anti-theft system as claimed in claim 3, wherein said transmitting unit is incorporated into a key, and said communication means includes a key cylinder having an antenna coil to provide the magnetic field to said transponder when said key is inserted into said key cylinder.

5. The anti-theft system as claimed in claim 1, wherein said control unit is connected to means for prohibiting operation of an engine of said vehicle, and said operation prohibiting means prohibits operation of said engine when said control unit does not receive said second check code.

6. The anti-theft system as claimed in claim 5, wherein said operation prohibiting means continues to prohibit operation of said engine when it is determined that said memory is disconnected from said control unit.

7. The anti-theft system as claimed in claim 1, wherein said memory comprises an electrically erasable programmable read only memory.

8. An anti-theft system for a vehicle comprising:
- a control unit, provided in said vehicle for controlling operation of said vehicle;
- a first memory directly connected to said control unit the memory unit storing a first check code and a first ID code;
- a second memory in which a second ID code is recorded;
- a transmitting unit transmitting a second check code to said control unit, said transmitting unit being separate from said control unit;
- prohibition withdrawing means for withdrawing prohibition of operation of said vehicle when said first check code matches said second check code and when said first ID code matches said second ID code;
- connection determining means for determining whether said first memory is connected to said control unit wherein a determination of the connection determining means is performed by reading the first check code stored in a predetermined address of the first memory and wherein the predetermined address is designated by the control unit when the determination is performed, and
- withdrawal prohibiting means for prohibiting withdrawal of prohibition of operation of said vehicle when at least one of the following conditions is satisfied:
  (a) it is determined that said first ID code does not match said second ID code, and
  (b) it is determined that said first memory is not connected to said control unit.

9. The anti-theft system as claimed in claim 8, further comprising deleting means for deleting said first check code and said first ID code in said first memory when it is determined that said first ID code does not match said second ID code.

10. The anti-theft system as claimed in claim 8, further comprising alarming means for generating an alarm when it is determined that said first ID code does not match said second ID code.

11. The anti-theft system as claimed in claim 8, further comprising changing means for changing said first ID code and said second ID code to a new ID code at a predetermined time period after it is determined that said first code matches said second ID code.

12. The anti-theft system as claimed in claim 8, wherein said first memory comprises an electrically erasable programmable read only memory.

13. The anti-theft system as claimed in claim 8, wherein said second memory comprises a random access memory.

* * * * *

UNITED STATES PATENT AND TRADEMARK OFFICE
CERTIFICATE OF CORRECTION

PATENT NO. : 5,763,958
DATED : June 9, 1998
INVENTOR(S) : Keiji YAMAMOTO, et al.

It is certified that error appears in the above-identified patent and that said Letters Patent is hereby corrected as shown below:

```
Column 1, line 21, change "without" to --unless--.

Column 3, line 41, before "this" insert --to--.

Column 7, line 35, change "The" to --the--.

Column 7, line 59, change "does" to --do--.

Column 9, line 11, change "Id" to --ID--.

Column 11, line 21, after "unit" insert a comma.

Column 11, line 34, after "unit" insert a comma.

Column 12, line 5, change "performed," to
```
--performed;--.

Signed and Sealed this

Second Day of March, 1999

Attest:

Q. TODD DICKINSON

*Attesting Officer*    Acting Commissioner of Patents and Trademarks